(12) United States Patent
Banga et al.

(10) Patent No.: US 7,131,403 B1
(45) Date of Patent: Nov. 7, 2006

(54) INTEGRATED ENGINE CONTROL AND COOLING SYSTEM FOR DIESEL ENGINES

(75) Inventors: Sandeep Banga, Erie, PA (US); Brian L. Walter, Erie, PA (US); Susan Mary Napierkowski, Erie, PA (US); William D. Glenn, Erie, PA (US); Gerald Edward Lacy, Erie, PA (US); Mahesh Aggarwal, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/366,684

(22) Filed: Mar. 2, 2006

Related U.S. Application Data

(60) Provisional application No. 60/723,803, filed on Oct. 5, 2005.

(51) Int. Cl.
 *F01P 1/06* (2006.01)
(52) U.S. Cl. .............. 123/41.31; 123/196 AB; 123/563
(58) Field of Classification Search ............. 123/41.31, 123/563, 196 AB; 60/599
 See application file for complete search history.

(56) References Cited

U.S. PATENT DOCUMENTS

| | | | |
|---|---|---|---|
| 5,415,147 A | 5/1995 | Nagle et al. | |
| 6,006,731 A | 12/1999 | Uzkan | |
| 6,230,668 B1 | 5/2001 | Marsh et al. | |
| 6,499,298 B1 | 12/2002 | Uzkan | |
| 6,604,515 B1 | 8/2003 | Marsh et al. | |
| 2002/0174653 A1 | 11/2002 | Uzkan | |

*Primary Examiner*—Tony M. Argenbright
*Assistant Examiner*—Katrina Harris
(74) *Attorney, Agent, or Firm*—Carlos Luis Hanze; James H. Beusse; Beusse Wolter Sanks Mora & Maire, P.A.

(57) ABSTRACT

A locomotive includes an engine (12), an intercooler (16), and an oil cooler (28), each having respective cooling passages formed therein. The locomotive also includes a cooling system (10) in selective communication with the respective cooling passages for selectively providing a first coolant (56) and a second coolant (52) at a higher temperature than the first coolant to the cooling passages. A method of operating the cooling system includes providing, in a first mode, a first coolant flow (26) to the intercooler and a second coolant flow (30) to the oil cooler at a first temperature different than the first coolant flow to achieve preferential cooling of the intercooler. The method also includes providing, in a second mode, the first coolant flow to the intercooler and the second coolant flow to the oil cooler at a second temperature different than the first coolant flow to achieve preferential cooling of the oil cooler.

24 Claims, 3 Drawing Sheets

INTEGRATED ENGINE CONTROL AND COOLING SYSTEM FOR DIESEL ENGINES

CROSS REFERENCE TO RELATED APPLICATIONS

This application claims priority to U.S. Provisional Application Ser. No. 60/723,803 filed on Oct. 5, 2005, and incorporated herein by reference.

FIELD OF THE INVENTION

This invention relates generally to internal combustion engines, and more particularly, to a cooling system and engine control method for turbocharged diesel engines used in locomotives.

BACKGROUND

Internal combustion engines, such as the turbocharged diesel engines used for rail locomotives, require cooling systems to limit the temperatures of various engine components. Internal combustion engines are known to be designed with internal cooling passages for the circulation of coolant to remove heat energy from the engine components. Lubricating oil which is circulated throughout the engine to reduce friction will also absorb heat and, therefore, will also require cooling to avoid reaching temperatures that would detrimentally affect its lubricity. Diesel engines often utilize turbochargers to increase power by compressing the intake combustion air to a higher density. Such compression results in the heating of the combustion air, which must then be cooled prior to its use to enable the engine to have high volumetric efficiency and low emissions of exhaust pollutants. For mobile applications such as rail locomotives, the only readily available heat sink is the surrounding ambient air. It is known to utilize a pumped cooling medium, such as water, to transport heat to finned radiator tubes. The radiator tubes then transfer the heat to the ambient air, often using forced convection provided by fans.

It is often desirable to maintain an internal combustion engine and its associated intake combustion air at multiple different temperatures in order to optimize the performance of the engine. Consequently, coolant at one temperature may be provided to the cylinder jackets of a turbocharged diesel engine and coolant at a lower temperature may be provided to an intercooler for cooling the compressed combustion air. Such a system may use a single pump, heat exchanger, and temperature control valve to accomplish the dual cooling objectives.

Other turbocharged diesel engine cooling schemes may use a subcooler in addition to a radiator. The subcooler is typically located upstream of the radiator in a flow of cooling ambient air. For locomotive applications, ambient air flowing through the radiators is normally provided by a multi-speed fan, since the radiators are positioned on the roof of the locomotive. The use of a subcooler provides a greater temperature difference capability between the temperature of the engine and the temperature of the combustion air.

DETAILED DESCRIPTION OF THE INVENTION

The inventors of the present invention have innovatively realized that by controlling coolant flows provided to different components of a turbocharged diesel engine, such as a locomotive engine, different desired operating characteristics of the engine may be achieved under different operational conditions. The invention includes a cooling system that has a divided coolant circuits that provide for coolant flows with different degrees of cooling. In an embodiment, the cooling system may be operated in a first cooling mode to provide a first coolant flow to an intercooler of the engine and a second coolant flow to an oil cooler of the engine at a first temperature different than the first coolant flow to achieve preferential cooling of the intercooler. The first mode may favor, or optimize, an emission level produced by the engine while maintaining a desired horsepower output of the engine. The cooling system may be operated in a second cooling mode to provide the first coolant flow to the intercooler and the second coolant flow to the oil cooler at a second temperature different than the first coolant flow to achieve preferential cooling of the oil cooler. The second mode may favor, or optimize, a horsepower output produced by the engine.

Figure 1:
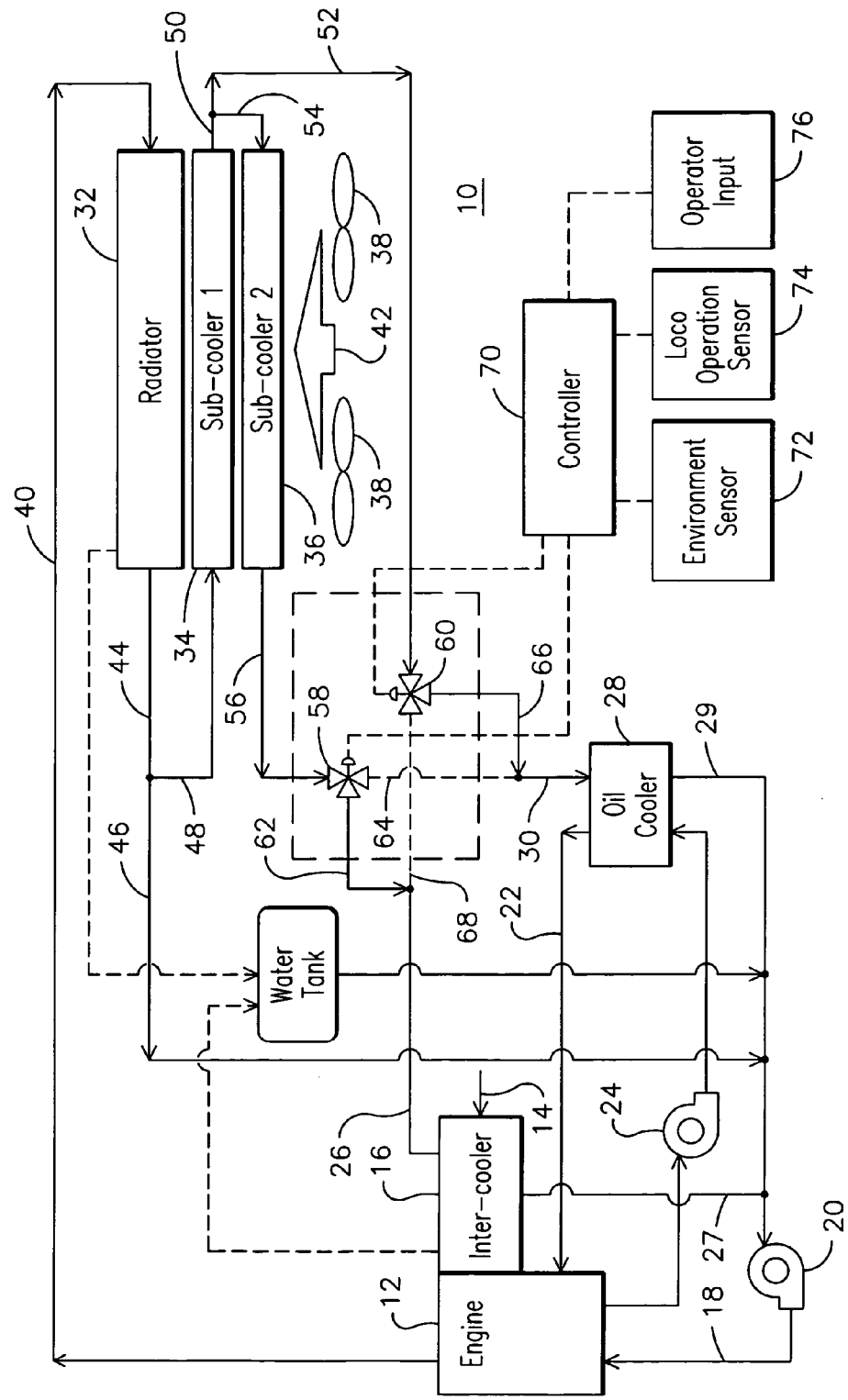
FIG. 1 is a schematic diagram of an exemplary embodiment of a cooling system for a turbocharged diesel engine.

FIG. 1 is schematic diagram of an exemplary embodiment of a cooling system 10 for a turbocharged diesel engine 12, such as may be used in a rail locomotive. The cooling system 10 includes a turbocharged diesel engine 12 receiving a flow of combustion air 14 through an intercooler 16 for cooling the combustion air 14. Combustion air 14 flowing through the intercooler 16 is cooled by a first coolant flow, or an intercooler coolant flow 26, using, for example, a heat exchanger disposed in the combustion air 14 within the intercooler 16. Heated intercooler coolant flow 27 discharged by the intercooler 16 may be mixed with an engine coolant flow 18 being provided to the engine 12. In an aspect of the invention, an amount of the intercooler coolant flow 26 provided to the intercooler 16 may be controlled to achieve a desired operating condition of the engine 12, such as a desired emission production level.

The engine 12 also includes lubricating oil passages that receive a flow of oil 22 recirculated by oil pump 24 through an oil cooler 28. Oil 22 flowing though the oil cooler 28 may be cooled by a second coolant flow, or an oil coolant flow 30, using, for example, a heat exchanger disposed in the oil coolant flow 30 within the oil cooler 28. Heated oil coolant flow 29 discharged by the oil cooler 28 may be mixed with the engine coolant flow 18 provided to the engine 12. In an aspect of the invention, an amount of the oil coolant flow 30 provided to the oil cooler 28 may be controlled to achieve a desired operating condition of the engine, such as maintaining a desired oil temperature to achieve a desired durability of engine 12.

The engine 12 also includes cooling passages receiving the flow of engine coolant flow 18 being recirculated by water pump 20 through radiator 32 and one or more subcoolers 34, 36. Heated engine coolant 40 flows into the radiator 32 and is cooled in a first stage by a flow of cooling air 42 forced across the radiator 32 by one or more fans 38. Upon exiting the radiator 32, the first stage cooled coolant flow 44 is split into a first portion 46 fed back to the engine 12 and a second portion 48 provided to a first sub cooler 34 for additional cooling in a second stage to a temperature below the first stage cooled coolant flow 44. Upon exiting the first sub cooler 34, the second stage cooled coolant flow 50 is split into a first coolant, or first portion 52, and a second portion 54. The second portion 54 is provided to a second sub cooler 36 for additional cooling in a third stage, so that a second coolant, or third stage cooled coolant flow 56, exiting the second sub cooler 36 has a temperature below the second stage cooled coolant flow 50.

In an aspect of the invention, the flows 52, 56 exiting respective subcoolers 34, 36 and being distributed to provide cooling for components of the cooling system 10 may be controlled to achieve desired operating conditions of the engine 12. In an embodiment, three way valves 58, 60 may be provided to selectively control the respective coolant flows 52, 56 provided to the oil cooler 28 and intercooler 16. Valve 58 receives the third stage cooled coolant flow 56 and controls an amount of a first portion 62 of the third stage cooled coolant flow 56 provided to the intercooler 16, and an amount of a second portion 64 provided to the oil cooler 28. Valve 60 receives the first portion 52 of the second stage cooled coolant flow 50 and controls an amount of a first portion 68 of the first portion 52 of the second stage cooled coolant flow 50 provided to the intercooler 16, and an amount of a second portion 66 provided to the oil cooler 28.

The cooling system 12 may be provided with a controller 70 for implementing steps necessary for controlling the flows of coolants within the system 12, such as by positioning of the three way valves 58,60 to control the flow of coolants to the intercooler 16 and oil cooler 28 to achieve desired operating conditions of the engine 12. Controller 70 may take any form known in the art, for example an analog or digital microprocessor or computer, and it may be integrated into or combined with one or more controllers used for other functions related to the operation of the engine 12. The controller 70 may be configured to control coolant flows corresponding to a desired engine operating mode, such as a mode that optimizes emissions, engine power, fuel efficiency, or engine durability. In an embodiment, an operational mode may be automatically or manually selected based on an environmental condition proximate the locomotive, such as an ambient temperature and/or altitude. The steps necessary for such processes may be embodied in hardware, software and/or firmware in any form that is accessible and executable by controller 70 and may be stored on any medium that is convenient for the particular application.

In an aspect of the invention, the controller 70 receives input signals from one or more sources, such as an environment sensor 72, a locomotive operation sensor 74 and/or an operator input 76. The environment sensor 72 may include an ambient temperature sensor and/or an altimeter. The locomotive operation sensor may include one or more coolant water temperature sensors, oil temperature sensors, a horse power demand control, and/or emissions sensors. An operator input may include a locomotive operation command input by a locomotive operator operating the locomotive that may include a specific operation mode command. Based on such inputs, the controller 70 may operate the flow control valves 58, 60, to control coolant flows 26, 30 provided to the intercooler 16 and oil cooler 28 to achieve a desired engine operating mode. For example, the amounts of respective coolant flow portions 62, 64, 66, 68 provided by the valves 58, 60 may be determined using techniques such as Kalman filtering or time sequenced Taylor series expansion algorithms in feedback and feed forward control loops. In another aspect, the controller 70 may control other components, such as other valves, pumps, fans, and/or thermostats to control flows of coolant, oil, and air in the system 10.

The cooling system 10 may include multiple modes of operation that may be controlled by controller 70. For example, through controlled selection of routing of the coolant flows, priority may be given to send the coolest coolant to either the intercooler 16 or the oil cooler 28, depending on a desired mode of operation. FIG. 1 shows positioning of flow control valves 58, 60 for an exemplary first mode of operation optimized for providing a desired emission level produced by the engine while maintaining a desired engine horsepower level. In the first mode, valve 58 may be positioned, for example, by controller 70, to direct the third stage cooled coolant flow 56 from the second sub cooler 36 to the intercooler 16 so that the intercooler 16 receives the coolest coolant available in the system 10. Accordingly, cooling of the combustion air 14 may be favored compared to cooling other components of the system 10. In another aspect, the valves 58, 60 may be positioned to allow mixing of first portion 62 with first portion 68 to generate a mixed intercooler coolant flow 26 provided to the intercooler 16. In the first mode, the intercooler coolant flow 26 may include more of the flow 56 than the first portion 52.

Figure 2:
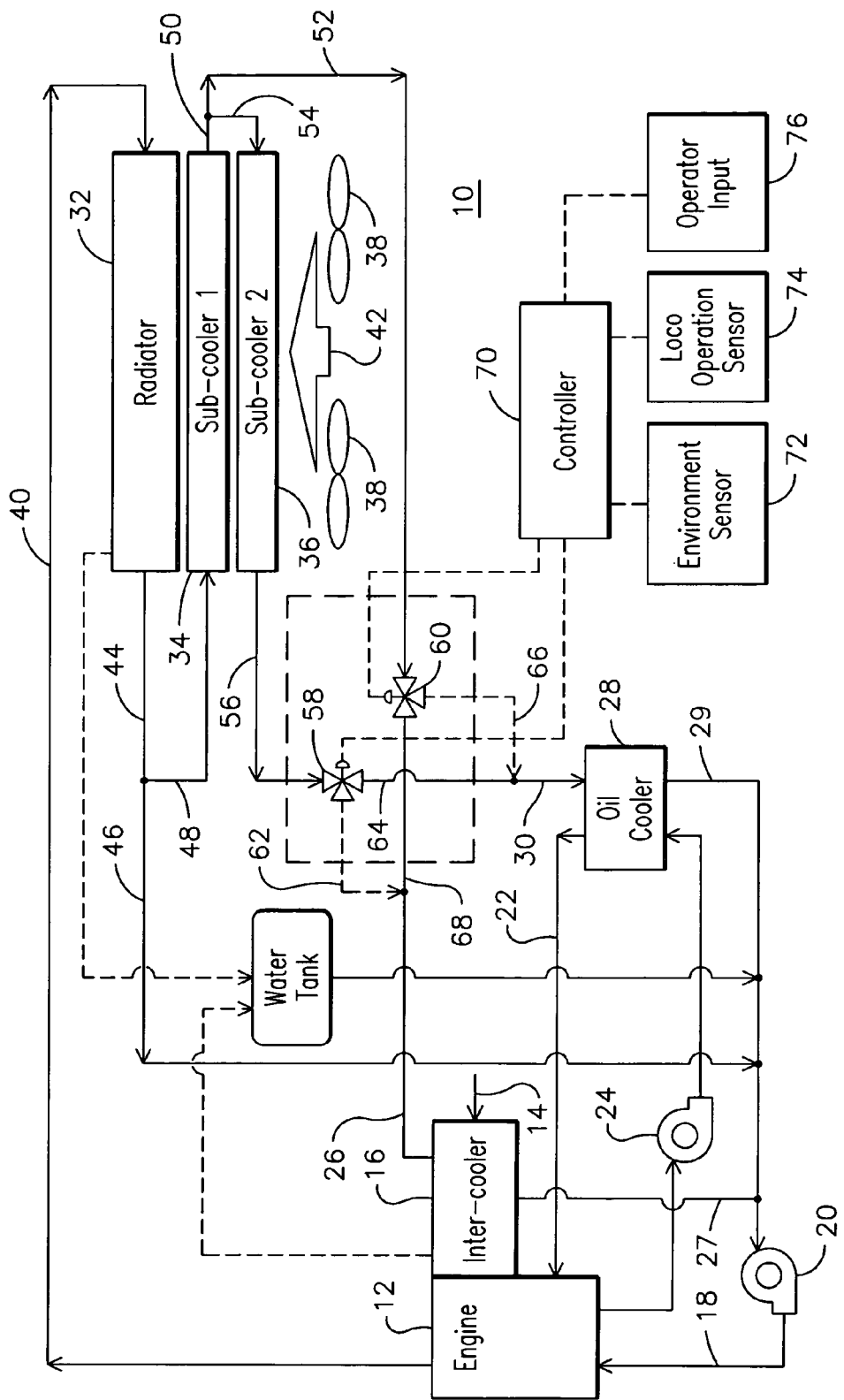
FIG. 2 is a schematic diagram of the cooling system of FIG. 1 configured in a different cooling mode.

FIG. 2 shows positioning of flow control valves 58, 60 for an exemplary second mode of operation optimized for providing a desired power level produced by the engine, for example, at ambient temperatures above which emission requirements may be difficult to achieve. In the second mode, valve 58 is positioned to direct the third stage cooled coolant flow 56 from the second sub cooler 36 to the oil cooler 28 so that it receives the coolest coolant available in the system 10. Accordingly, cooling of the oil 22 is favored, or optimized, compared to cooling other components. Valve 60 is positioned to direct the first portion 52 of the second stage cooled coolant flow 50 from the first sub cooler 34 to the intercooler 16, thereby providing a relatively warmer coolant flow to the intercooler 16 than that provided to the oil cooler 28. The valves 58, 60 may also be positioned to allow mixing of the second portion 66 with the second portion 64 to generate a mixed oil coolant flow 30 provided to the oil cooler 28. In a second mode, the oil coolant flow 30 may include more of the third stage cooled coolant flow 56 than the first portion 52.

In a third exemplary mode which may be implemented at ambient operating temperatures lower than temperatures when operating in the first mode, the coolant flows may be controlled to achieve a desired engine durability. In any mode, engine durability is not compromised.

Figure 3:
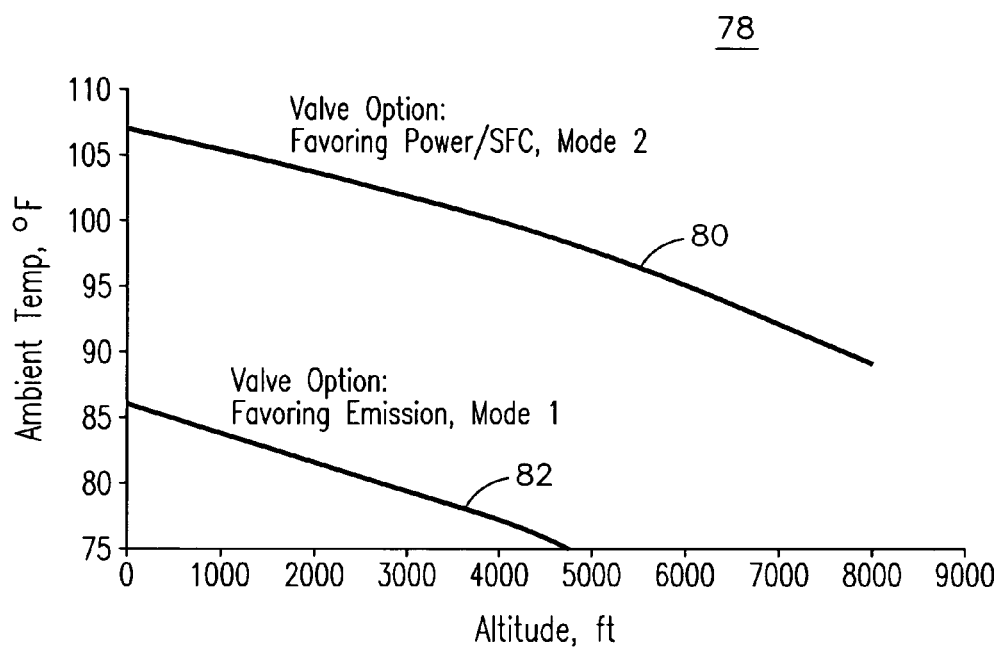
FIG. 3 is a graph of engine performance for exemplary cooling modes of the cooling system of FIG. 1 under varying operating environment conditions.

FIG. 3 shows a graph 78 of engine performance for exemplary cooling modes of the cooling system 10 under varying operating environment conditions. Curve 80 represents operation of the cooling system 10 at higher ambient temperatures according to the second mode favoring power. Curve 82 represents operation of the cooling system 10 at lower ambient temperatures according to the first mode favoring emissions such as may be required by regulatory agencies at ambient temperatures below about 86 degrees Fahrenheit, for example, at sea level.

Based on the foregoing specification, the invention may be implemented using computer programming or engineering techniques including computer software, firmware, hardware or any combination or subset thereof, wherein the technical effect is to provide an integrated engine control and cooling system for diesel engines. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While various embodiments of the present invention have been shown and described herein, it will be obvious that such embodiments are provided by way of example only. Numerous variations, changes and substitutions may be made without departing from the invention herein. For example, the system and method may be applied to flooded wet or wet/dry cooling systems. Accordingly, it is intended that the invention be limited only by the spirit and scope of the appended claims.

What is claimed is:

1. In a locomotive having an engine, an intercooler, and an oil cooler, each having respective cooling passages formed therein, and a cooling system in selective communication with the respective cooling passages for selectively providing a first coolant and a second coolant at a higher temperature than the first coolant to the cooling passages, a method of operating the cooling system comprising:
   providing, in a first mode, a first coolant flow to the intercooler and a second coolant flow to the oil cooler at a first temperature different than the first coolant flow to achieve preferential cooling of the intercooler effective to optimize an emission level produced by the engine while maintaining a desired horsepower output produced by the engine; and
   providing, in a second mode, the first coolant flow to the intercooler and the second coolant flow to the oil cooler at a second temperature different than the first coolant flow to achieve preferential cooling of the oil cooler effective to optimize a horsepower output produced by the engine.

2. The method of claim 1, wherein the first temperature of the second coolant flow is higher than a temperature of the first coolant flow.

3. The method of claim 2, further comprising, in the first mode, directing the first coolant into the first coolant flow.

4. The method of claim 2, further comprising, in the first mode, directing more of the first coolant into the first coolant flow than the second coolant.

5. The method of claim 2, further comprising, in the first mode, directing more of the second coolant into the second coolant flow than the first coolant.

6. The method of claim 1, wherein the second temperature of the second coolant flow is lower than a temperature of the first coolant flow.

7. The method of claim 6, further comprising, in the second mode, directing the first coolant into the second coolant flow.

8. The method of claim 6, further comprising, in the second mode, directing more of the second coolant into the first coolant flow than the first coolant.

9. The method of claim 6, further comprising, in the second mode, directing more of the first coolant into the second coolant flow than the second coolant.

10. The method of claim 1, further comprising selectively configuring the cooling system in a desired mode according to an input from an environmental sensor sensing an environmental condition proximate the locomotive.

11. The method of claim 1, further comprising selectively configuring the cooling system in a desired mode according to an input from a locomotive operation sensor sensing an operational condition of the locomotive.

12. The method of claim 1, further comprising selectively configuring the cooling system in a desired mode according to a control signal provided by an operator of the locomotive.

13. The method of claim 1, further comprising implementing the second mode when the ambient temperature proximate the locomotive is above a predetermined value at a predetermined operating altitude.

14. The method of claim 1, further comprising implementing the second mode when the locomotive is operating in a condition wherein an emissions requirement is waived.

15. The method of claim 1, further comprising implementing the first mode when the ambient temperature proximate the locomotive is within a predetermined range at a predetermined operating altitude.

16. The method of claim 1, further comprising providing, in a third mode, the first coolant flow to the intercooler and the second coolant flow to the oil cooler at a third temperature different than the first coolant flow to achieve a desired engine durability.

17. The method of claim 1, further comprising implementing the third mode when the ambient temperature proximate the locomotive is below a predetermined value at a predetermined operating altitude.

18. A cooling system for a locomotive having an engine, an intercooler, and an oil cooler, each having respective cooling passages formed therein, and a first cooler and a second cooler in selective communication with the respective cooling passages for selectively providing a first coolant and a second coolant at a warmer temperature than the first coolant to the cooling passages, the system comprising:
   a cooling circuit configurable in a first mode for directing more of the first coolant than the second coolant to the intercooler and a more of the second coolant to the oil cooler effective to optimize an emission level produced by the engine while maintaining a desired horsepower output produced by the engine and configurable in a second mode for directing a more of the second coolant than the first coolant to the intercooler and a more of the first coolant than the second coolant to the oil cooler effective to optimize a horsepower output produced by the engine;
   a first valve for selectively controlling the first coolant flow provided by the engine;
   a second valve for selectively controlling the second coolant flow provided by the engine;

a controller controlling respective positions of the valves to selectively configure the cooling system in the first mode and second mode according to an input received by the controller.

19. The system of claim 18, wherein the input comprises a signal provided by environmental sensor sensing an environmental condition proximate the locomotive.

20. The system of claim 18, wherein the input comprises a signal provided by locomotive operation sensor sensing an operational condition of the locomotive.

21. The system of claim 20, wherein the locomotive operation sensor comprises a coolant temperature sensor, an oil temperature sensor, or an emission sensor.

22. The system of claim 18, wherein the input comprises a control signal provided by an operator of the locomotive.

23. The system of claim 22, wherein the control signal comprises a horsepower demand control signal.

24. In a locomotive having an engine, an intercooler, and an oil cooler, each having respective cooling passages formed therein, and a cooling system in selective communication with the respective cooling passages for selectively providing a first coolant and a second coolant at a higher temperature than the first coolant to the cooling passages, computer readable media containing program instructions for operating the cooling system, the computer readable media comprising:

a computer program code for configuring the cooling system to provide, in a first mode, a first coolant flow to the intercooler and a second coolant flow to the oil cooler at a first temperature different than the first coolant flow to achieve preferential cooling of the intercooler effective to optimize an emission level produced by the engine while maintaining a desired horsepower output produced by the engine; and a computer program code for configuring the cooling system to provide, in a second mode, the first coolant flow to the intercooler and the second coolant flow to the oil cooler at a second temperature different than the first coolant flow to achieve preferential cooling of the oil cooler effective to optimize a horsepower output produced by the engine.

* * * * *